United States Patent
Iglewski (10) Patent No.: US 12,479,587 B2
(45) Date of Patent: Nov. 25, 2025

(54) SKELETON SCREEN FOR AN AIR INTAKE PORTION OF A MACHINE

(71) Applicant: General Electric Company Polska sp. z o.o., Warsaw (PL)

(72) Inventor: Tomasz Iglewski, Warsaw (PL)

(73) Assignee: General Electric Company Polska sp. z o.o., Warsaw (PL)

( * ) Notice: Subject to any disclaimer, the term of this patent is extended or adjusted under 35 U.S.C. 154(b) by 564 days.

(21) Appl. No.: 17/381,448

(22) Filed: Jul. 21, 2021

(65) Prior Publication Data

US 2022/0194617 A1   Jun. 23, 2022

(30) Foreign Application Priority Data

Dec. 21, 2020   (PL) ........................................ 436409

(51) Int. Cl.
| | |
|---|---|
| *B01D 46/10* | (2006.01) |
| *B01D 29/00* | (2006.01) |
| *B64D 33/02* | (2006.01) |
| *F02C 7/055* | (2006.01) |

(52) U.S. Cl.
CPC ............. *B64D 33/02* (2013.01); *B01D 29/00* (2013.01); *B01D 46/10* (2013.01); *F02C 7/055* (2013.01); *B01D 2279/60* (2013.01); *B64D 2033/022* (2013.01)

(58) Field of Classification Search
CPC ...... B21F 25/00; B21F 27/005; B21F 27/121; B21F 140/06; B21F 140/07; B21F 140/09; B64D 33/02; B64D 2033/022; B01D 29/00; B01D 46/10; B01D 2279/60; F02C 7/055
See application file for complete search history.

(56) References Cited

U.S. PATENT DOCUMENTS

| | | | | |
|---|---|---|---|---|
| 182,212 | A * | 9/1876 | McGlin | B21F 25/00 256/6 |
| 215,404 | A * | 5/1879 | Shuman | B21F 25/00 256/6 |
| 295,251 | A * | 3/1884 | Hulbert | B21F 27/005 245/10 |
| 1,759,256 | A * | 5/1930 | Harter | B21F 27/005 245/5 |
| 1,784,453 | A * | 12/1930 | Land | B21F 27/005 245/8 |
| 1,816,381 | A * | 7/1931 | Land | B21F 27/005 D25/48.8 |
| 1,847,771 | A * | 3/1932 | Arthur | B21F 27/005 245/5 |
| 1,859,831 | A * | 5/1932 | Arthur | B21F 27/005 245/8 |
| 2,392,223 | A | 1/1946 | Brickman | |
| 2,747,685 | A | 5/1956 | Foley | |
| 3,342,003 | A * | 9/1967 | Frank | E04C 5/04 52/645 |

(Continued)

FOREIGN PATENT DOCUMENTS

| | | |
|---|---|---|
| CN | 109603346 A | 4/2019 |
| GB | 737102 A | 9/1955 |

*Primary Examiner* — Dung H Bui
(74) *Attorney, Agent, or Firm* — Dority & Manning, P.A.

(57) ABSTRACT

A screen for an air intake portion of a machine is provided. The screen includes an assembly of screen members that form a plurality of screen cells, wherein at least a portion of the screen cells define an irregular configuration.

8 Claims, 7 Drawing Sheets

(56) References Cited

U.S. PATENT DOCUMENTS

| | | | | |
|---|---|---|---|---|
| 3,426,981 | A | 2/1969 | Allcock | |
| 3,844,510 | A * | 10/1974 | Tolliver | B21F 27/127 138/175 |
| 4,081,148 | A * | 3/1978 | Murphy | B21F 27/005 403/207 |
| 5,924,458 | A * | 7/1999 | Kaines | B21F 15/06 138/175 |
| 7,803,204 | B1 * | 9/2010 | Mladinich | F02C 7/055 55/306 |
| 8,936,508 | B2 | 1/2015 | Ameyugo | |
| 9,187,901 | B2 * | 11/2015 | Ogden | E04F 13/047 |
| 9,873,522 | B2 | 1/2018 | Snyder et al. | |
| 10,266,275 | B1 * | 4/2019 | Scimone | B64D 33/02 |
| 10,450,954 | B2 | 10/2019 | Grissino et al. | |
| 2010/0071300 | A1 * | 3/2010 | Kang | D03D 25/005 52/646 |
| 2010/0266350 | A1 * | 10/2010 | Paredes Montecinos | B21F 27/005 405/302.3 |
| 2010/0313542 | A1 | 12/2010 | Bansa et al. | |
| 2011/0016845 | A1 * | 1/2011 | Silva | B64D 33/02 60/39.092 |
| 2012/0126191 | A1 * | 5/2012 | Kosedag | E04H 17/045 256/7 |
| 2012/0181389 | A1 * | 7/2012 | Flemming | B64D 15/16 244/53 B |
| 2013/0014341 | A1 * | 1/2013 | Hershbarger | F01P 11/12 15/339 |
| 2017/0145919 | A1 * | 5/2017 | Aubert | B64C 27/06 |
| 2017/0241085 | A1 * | 8/2017 | Cornelus | E01C 11/005 |
| 2017/0268424 | A1 * | 9/2017 | Grissino | F02C 7/047 |
| 2018/0149084 | A1 | 5/2018 | Duge | |
| 2018/0195284 | A1 * | 7/2018 | Von Allmen | E04C 5/06 |
| 2018/0215478 | A1 * | 8/2018 | Iglewski | B64D 33/02 |
| 2018/0245514 | A1 | 8/2018 | Kyritsis | |

\* cited by examiner

SKELETON SCREEN FOR AN AIR INTAKE PORTION OF A MACHINE

RELATED APPLICATIONS

The present application claims priority to Polish Patent Application No. P.436409 filed Dec. 21, 2020.

FIELD

The present subject matter relates generally to air intake portions of a machine, or more particularly to a foreign object damage (FOD) protection screen for air intake portions of turbines and other machinery.

BACKGROUND

Foreign object damage (FOD) protection screens are used to protect machines against foreign objects or ice being sucked into said machine. For example, aircraft and aircraft engine icing is a persistent issue that must be dealt with in most aircraft applications. The prevention of FOD is necessary for protection from shedding damage, inlet airflow distortion, and inlet airflow blockage. However, the more structure and material provided with a protection screen causes for aerodynamic losses which can impact the performance of the machine.

Thus, it is desirable to protect machines against foreign objects while also reducing aerodynamic losses.

BRIEF DESCRIPTION

Aspects and advantages of the invention will be set forth in part in the following description, or may be obvious from the description, or may be learned through practice of the invention.

In one exemplary embodiment of the present disclosure, a screen for an air intake portion of a machine is provided. The screen includes an assembly of screen members that form a plurality of screen cells, wherein at least a portion of the screen cells define an irregular configuration.

In certain exemplary embodiments the screen includes a barrier screen member that extends into a cavity of at least one of the screen cells.

In certain exemplary embodiments the barrier screen member terminates at an open end, and wherein the open end does not touch any portion of the screen cells.

In certain exemplary embodiments the barrier screen member extends orthogonal to a portion of the screen cells.

In certain exemplary embodiments the barrier screen member extends oblique to a portion of the screen cells.

In certain exemplary embodiments the plurality of screen cells include a staggered and alternating arrangement of a plurality of barrier screen members.

In certain exemplary embodiments each of the screen cells define the irregular configuration.

In another exemplary embodiment of the present disclosure, a screen for an air intake portion of a machine is provided. The screen includes a modified mesh geometry of screen members that form a plurality of screen cells; and a barrier screen member that extends into a cavity of each of the screen cells.

In certain exemplary embodiments each of the barrier screen members terminate at an open end, and wherein the open end of each of the barrier screen members do not touch any portion of the screen cells.

In certain exemplary embodiments at least one of the barrier screen members extend orthogonal to a portion of the screen cells.

In certain exemplary embodiments at least one of the barrier screen members extend oblique to a portion of the screen cells.

In certain exemplary embodiments the plurality of screen cells include a staggered and alternating arrangement of barrier screen members.

In certain exemplary embodiments each of the screen cells include a second barrier screen member that extends into the cavity of the screen cell and terminates at a second open end, and wherein the second open end of each of the second barrier screen members do not touch any portion of the screen cells.

In an exemplary aspect of the present disclosure, a method is provided for forming a screen for an air intake portion of a machine. The method includes forming an assembly of screen members that form a plurality of screen cells; and eliminating a portion of screen within each of the screen cells.

In certain exemplary aspects each of the screen cells having the portion of screen removed extend into a cavity of the screen cell and terminate at an open end, and wherein the open end of each of the screen cells having the portion of screen removed do not touch any portion of the screen cells.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin. Here and throughout the specification and claims, range limitations are combined and interchanged, such ranges are identified and include all the sub-ranges contained therein unless context or language indicates otherwise.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In exemplary embodiments of the present disclosure, a screen for an air intake portion of a machine includes an assembly of screen members that form a plurality of screen cells and at least a portion of the screen cells define an irregular configuration.

In exemplary embodiments of the present disclosure, a screen for an air intake portion of a machine includes an assembly of screen members that form a plurality of screen cells and a barrier screen member that extends into a cavity of each of the screen cells. Each of the barrier screen members terminate at an open end and the open end of each of the barrier screen members do not touch any portion of the screen cells. In this manner, a screen of the present disclosure eliminates portions of the screen members to reduce aerodynamic losses while maintaining the same foreign object protection. Furthermore, a screen of the present disclosure also reduces the overall weight of the screen.

Figure 1:
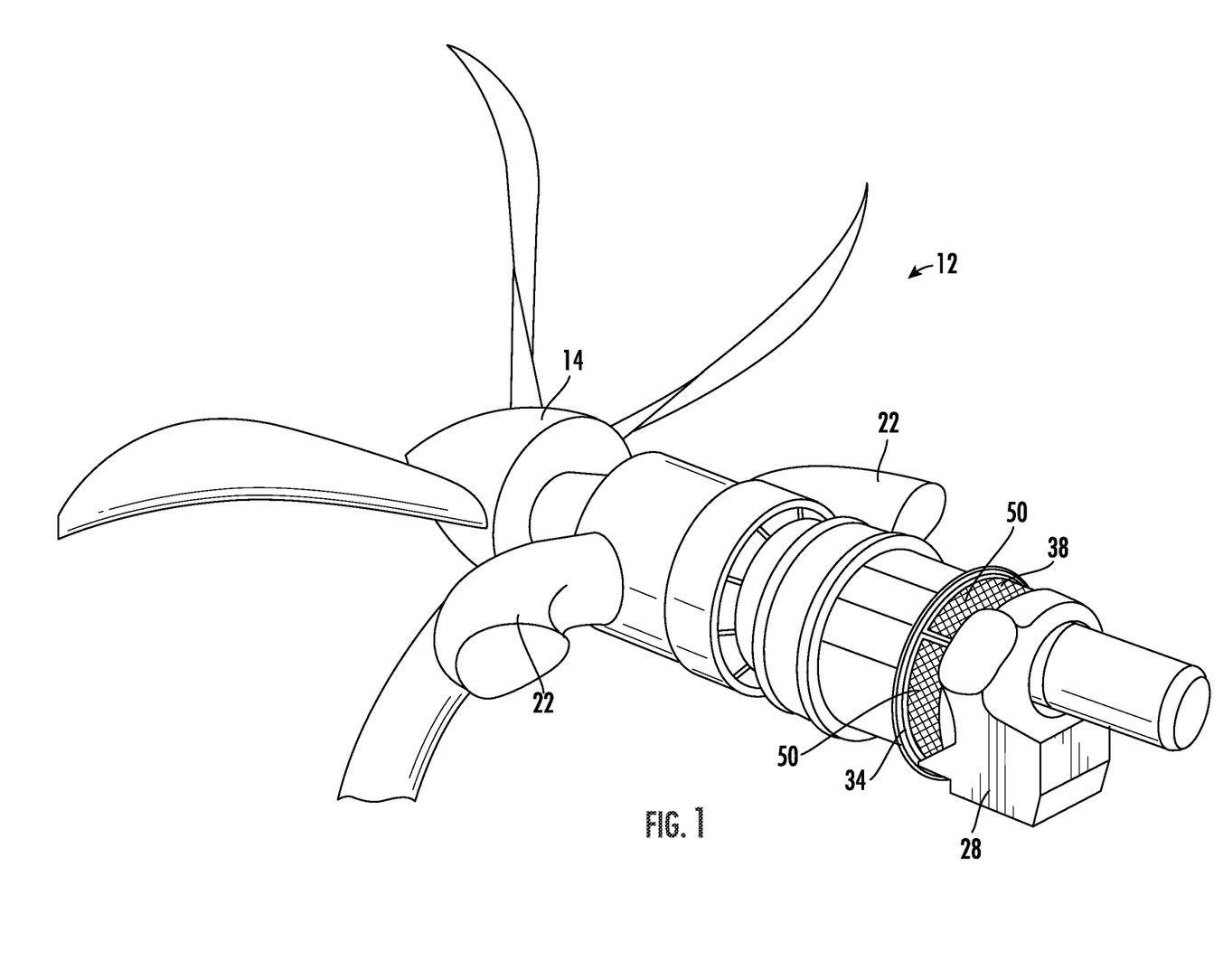
FIG. 1 is a perspective view of an exemplary machine having a screen in accordance with exemplary embodiments of the present disclosure.

Referring now to the drawings, wherein identical numerals indicate the same elements throughout the figures, FIG. 1 is a perspective view of an engine 12 that includes at least one screen 50 arranged in a screen assembly 38 such that the plurality of screens 50 each cover an air intake inlet 34. In an exemplary embodiment, the engine 12 may include a propeller assembly 14, exhausts 22, and a mounting block 28. In the illustrated embodiment, the engine 12 is a turboprop aircraft engine. In other embodiments, the engine 12 could be configured for use in marine and industrial applications. Additionally, or alternatively, aspects of the present disclosure may be incorporated into any other suitable gas turbine engine, such as a turboshaft engine, turboprop engine, turbojet engine, open rotor or unducted turbofan engine, a land-based gas turbine engine for power generation, an aeroderivative gas turbine engine, etc. Furthermore, it is contemplated that a screen of the present disclosure is compatible with any air intake portion of a machine.

Figure 2:
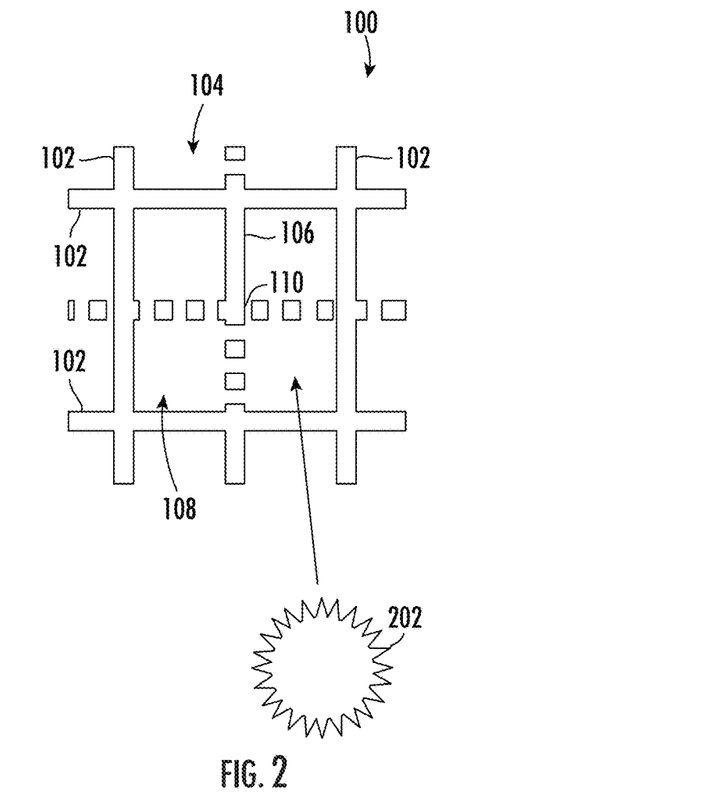
FIG. 2 is a side elevation view of a screen having a barrier screen member or screen cells including a portion of screen removed in accordance with an exemplary embodiment of the present disclosure.
Figure 3:
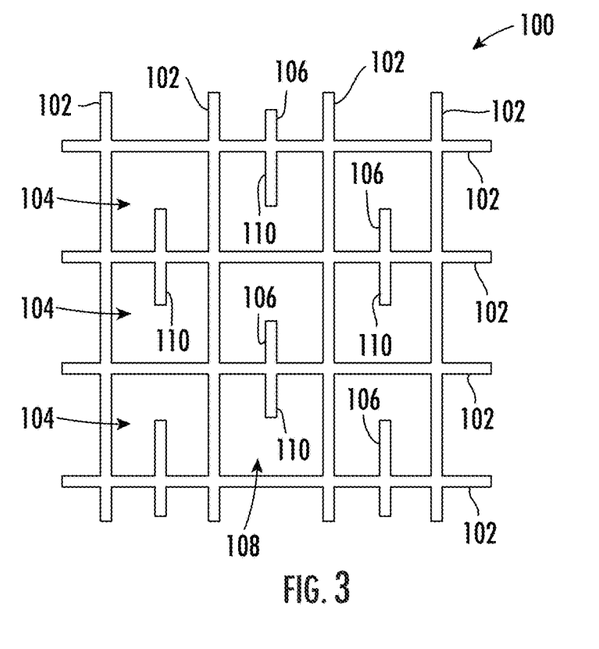
FIG. 3 is a side elevation view of a screen having a plurality of barrier screen members or screen cells including a portion of screen removed in accordance with an exemplary embodiment of the present disclosure.

FIGS. 2-5 illustrate exemplary embodiments of the present disclosure. Referring to FIGS. 2 and 3, a first configuration of a screen 100 of the present disclosure for an air intake portion of a machine, e.g., an air intake inlet 34 of an engine 12 (FIG. 1), is shown.

Referring to FIGS. 2 and 3, in exemplary embodiments, the screen 100 includes an assembly of screen members 102 that form a plurality of screen cells 104 and each of the screen cells 104 include a portion of screen removed as described herein.

Figure 4:
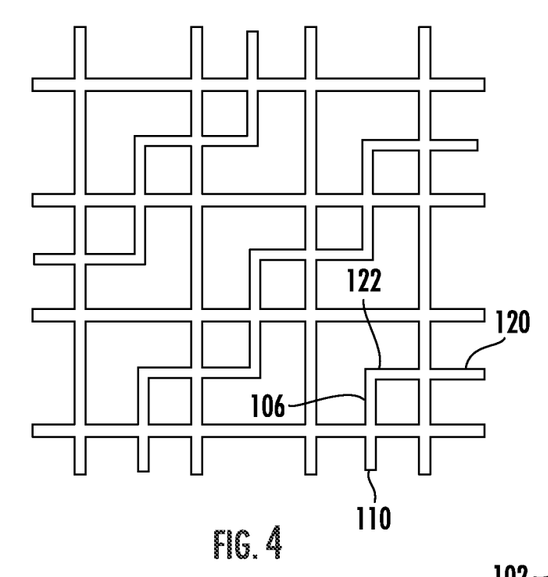
FIG. 4 is a side elevation view of a screen having first and second barrier screen members or screen cells including portions of screen removed in accordance with another exemplary embodiment of the present disclosure.
Figure 5:
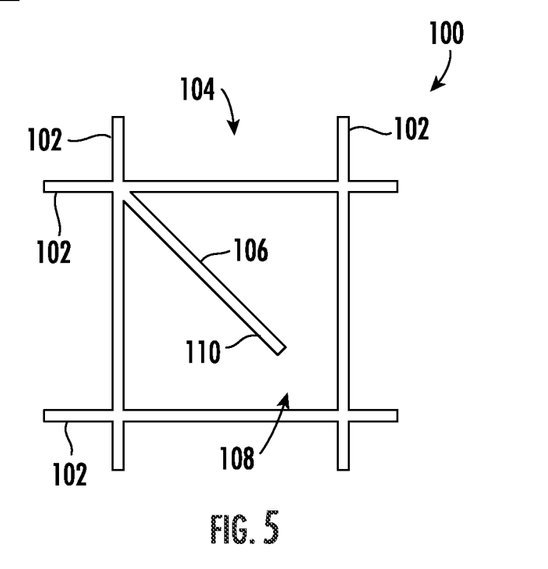
FIG. 5 is a side elevation view of a screen having a barrier screen member or screen cells including a portion of screen removed in accordance with another exemplary embodiment of the present disclosure.
Figure 7:
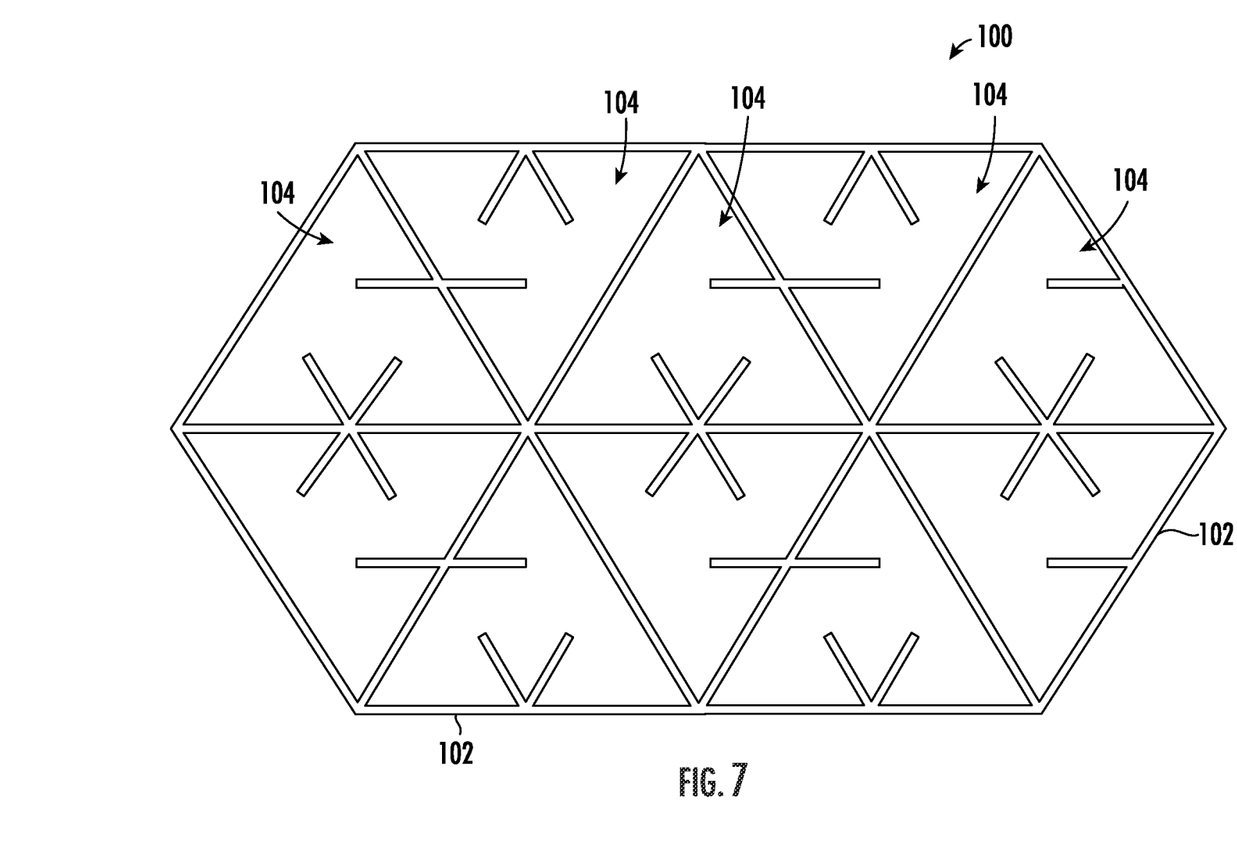
FIG. 7 is a side elevation view of a screen having first and second barrier screen members or screen cells including portions of screen removed in accordance with another exemplary embodiment of the present disclosure.
Figure 8:
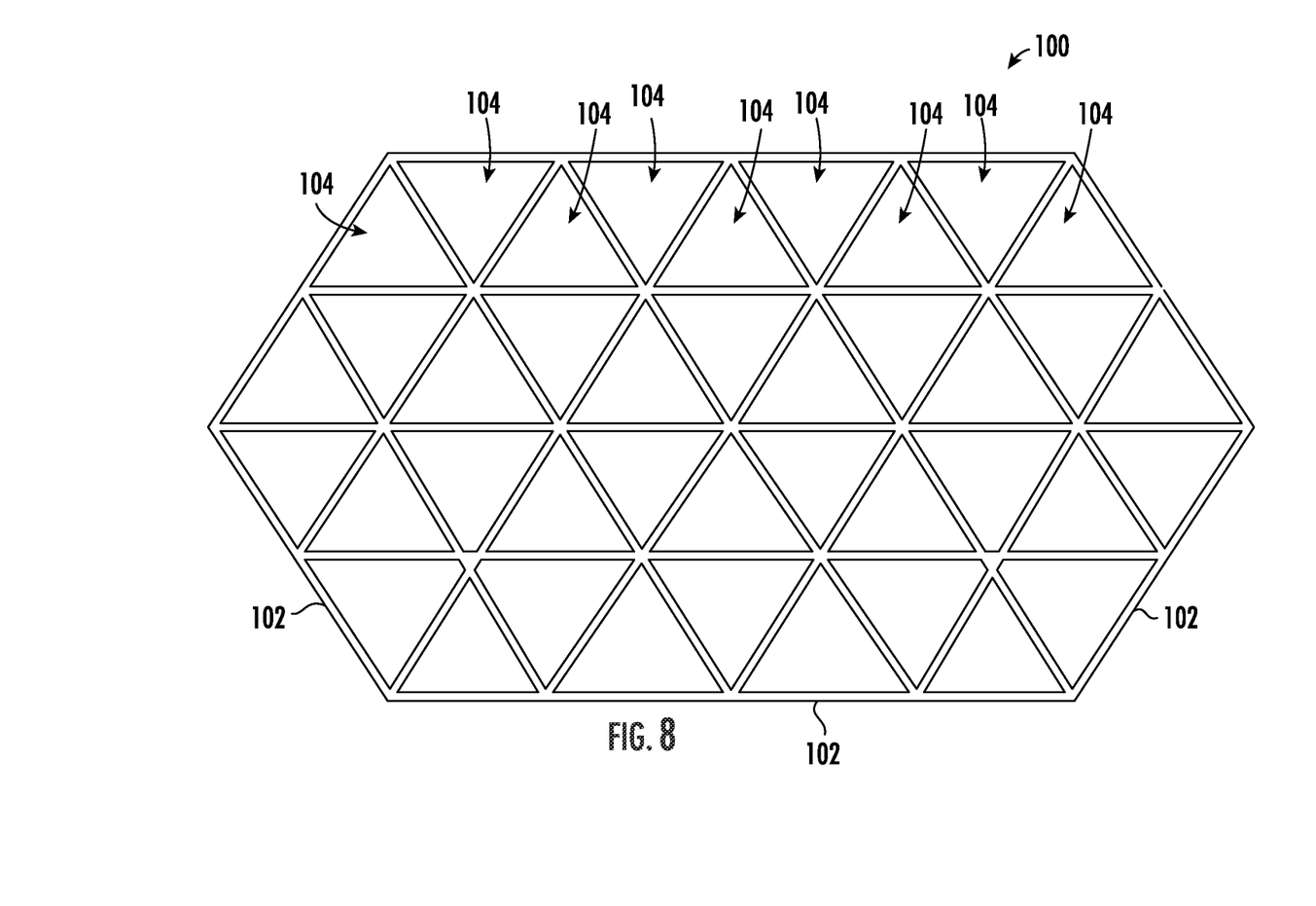
FIG. 8 is a side elevation view of a screen in accordance with another exemplary embodiment of the present disclosure.
Figure 9:
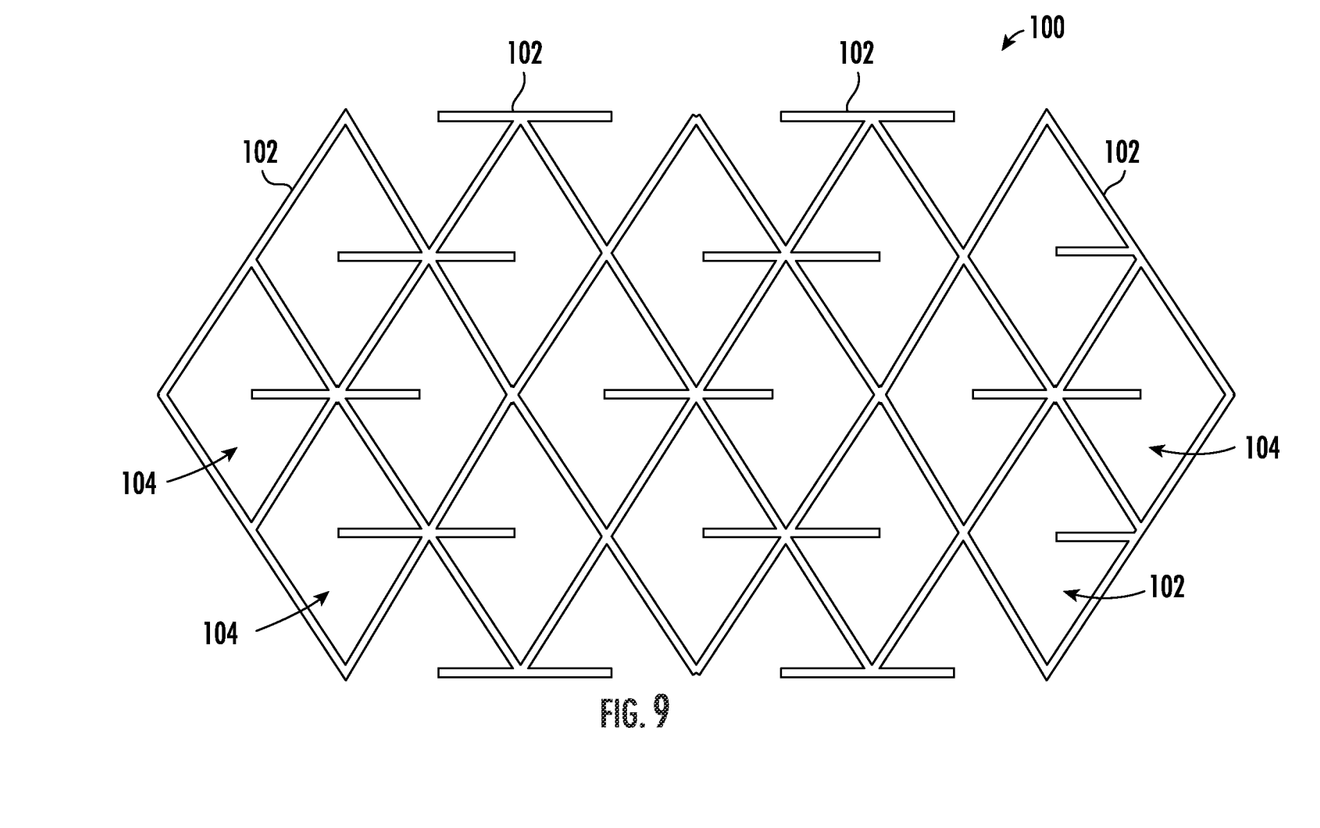
FIG. 9 is a side elevation view of a screen having first and second barrier screen members or screen cells including portions of screen removed in accordance with another exemplary embodiment of the present disclosure.
Figure 10:
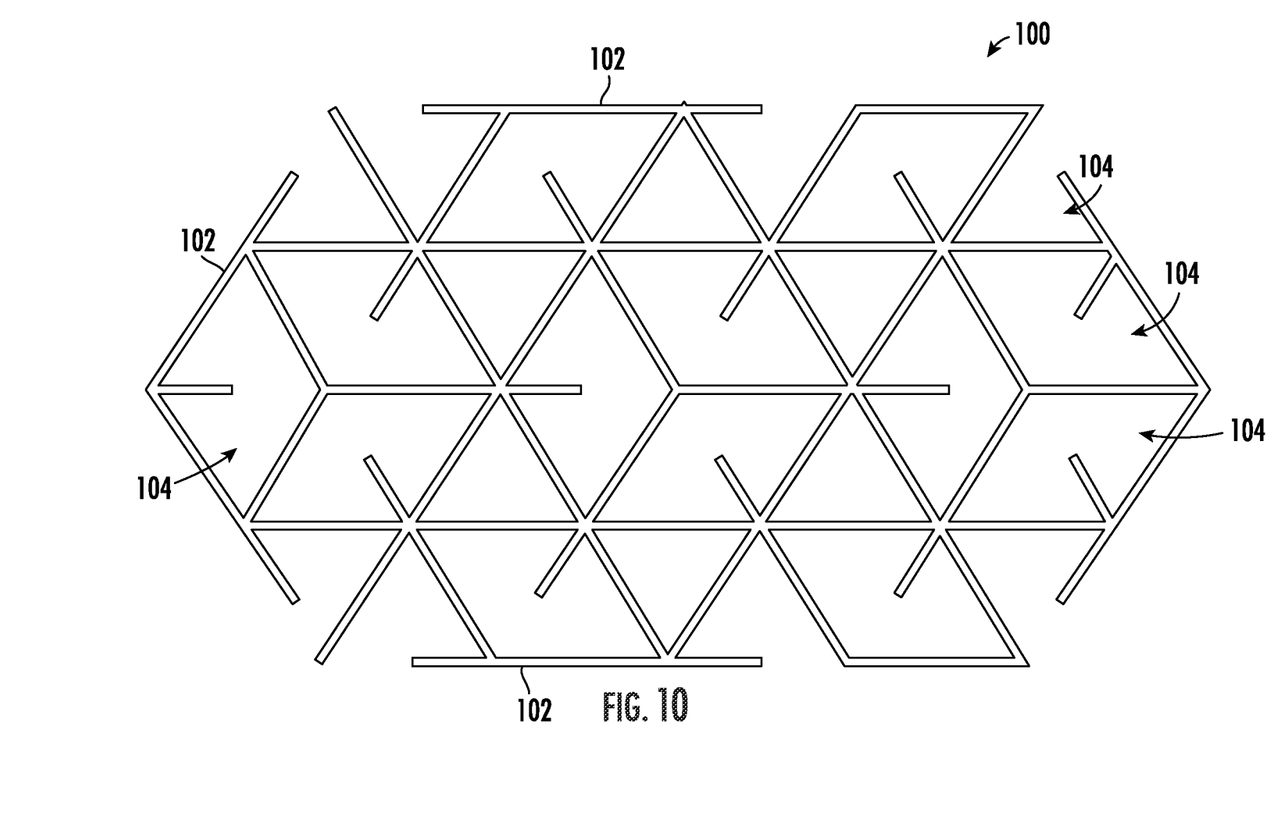
FIG. 10 is a side elevation view of a screen having first and second barrier screen members or screen cells including portions of screen removed in accordance with another exemplary embodiment of the present disclosure.

According to some exemplary embodiments of the present disclosure, a screen 100 for an air intake portion 34 of a machine 12 includes an assembly of screen members 102 that form a plurality of screen cells 104 and at least a portion of the screen cells define an irregular configuration. As used herein, the term "irregular configuration" with respect to a screen cell refers to an irregular configuration of screen members, an irregular cavity formed by the screen members, and/or an irregular space defined or bounded by the screen members. As used herein, the term "irregular configuration" with respect to a screen cell may refer to an asymmetrical configuration as defined by the screen cell 104 of FIG. 5. In some exemplary embodiments, a screen cell defining an irregular configuration includes more than four (4) members. For example, FIGS. 3 and 4 illustrate exemplary embodiments of the present disclosure where each screen cell 104 includes six (6) members. FIG. 5 illustrates an exemplary embodiment of the present disclosure where a screen cell 104 includes five (5) members. FIG. 7 illustrates an exemplary embodiment of the present disclosure where a plurality of screen cells 104 include eight (8) members. FIGS. 9 and 10 illustrate exemplary embodiments of the present disclosure where a screen cell 104 includes five (5) members.

In exemplary embodiments, the term "irregular configuration" is intended to mean a configuration or cavity shape that is none of a triangle, quadrilateral, pentagon, or hexagon (e.g., the non-square cavity shown in FIG. 4 or non-square cavity having four sides with a barrier screen member 106 extending into a cavity 108 shown in FIG. 5). In some exemplary embodiments the irregular configuration or shape may be taken to mean at least one cantilevered member 106 that extends between members that form the outer periphery or outer walls of the cavity 108.

Referring to FIGS. 2 and 3, in exemplary embodiments, the screen 100 includes an assembly of screen members 102 that form a plurality of screen cells 104 and a barrier screen member or cantilevered member 106 that extends into a cavity 108 of each of the screen cells 104. Furthermore, each of the screen cells 104 having the portion of screen removed extend into a cavity 108 of the screen cell 104 and terminate at an open end 110.

Figure 6:
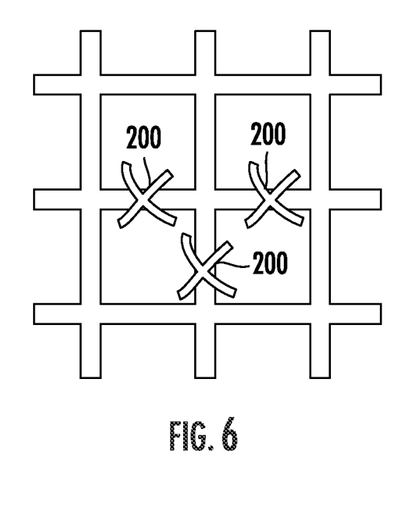
FIG. 6 is a side elevation view of a screen illustrating eliminated portions of a screen.

In one exemplary embodiment, the assembly of screen members 102 comprise a modified mesh geometry that forms the plurality of screen cells 104. For example, each of the barrier screen members 106 terminate at an open end 110 and the open end 110 of each of the barrier screen members 106 do not touch any portion of the screen cells 104. In this manner, a screen 100 of the present disclosure eliminates portions of the screen members to reduce aerodynamic losses while maintaining the same foreign object protection. For example, referring to FIG. 6, a screen 100 (FIGS. 2 and 3) of the present disclosure eliminates portions 200 of screen members. In one exemplary embodiment, one screen member 200 is eliminated in every screen cell 104. In another exemplary embodiment, two screen members 200 are eliminated in every screen cell 104. In yet another exemplary embodiment, three screen members 200 are eliminated in every screen cell 104. Furthermore, a screen 100 of the present disclosure also reduces the overall weight of the screen 100.

Referring to FIGS. 2 and 3, in one exemplary embodiment, at least one of the barrier screen members 106 or at least one of the screen cells 104 having the portion of screen removed extend orthogonal to a portion of the screen cells 104. Referring to FIG. 2, the barrier screen member 106 or at least one of the screen cells 104 having the portion of screen removed may extend orthogonally any distance within the cavity 108 of the screen cell 104. In this manner, the screen 100 of the present disclosure is able to maintain the same level of FOD protection as conventional screens. For example, referring to FIG. 2, the screen 100 of the present disclosure is able to block a foreign object 202 from passing through a screen cell 104 of the screen 100. The farther the barrier screen member 106 extends within the cavity 108 of the screen cell 104, the smaller the foreign object 202 that can be prevented from flowing through the screen 100.

Referring to FIG. 5, in another exemplary embodiment, at least one of the barrier screen members 106 or at least one of the screen cells 104 having the portion of screen removed extend oblique to a portion of the screen cells 104. Referring to FIG. 5, the barrier screen member 106 or at least one of the screen cells 104 having the portion of screen removed may extend obliquely any distance within the cavity 108 of the screen cell 104. In this manner, the screen 100 of the present disclosure is able to maintain the same level of FOD protection as conventional screens. For example, the screen 100 of the present disclosure is able to block a foreign object 202 (FIG. 2) from passing through a screen cell 104 of the screen 100. The farther the barrier screen member 106 extends within the cavity 108 of the screen cell 104, the smaller the foreign object 202 that can be prevented from flowing through the screen 100.

Referring to FIG. 3, in an exemplary embodiment, the plurality of screen cells 104 include a staggered and alternating arrangement of barrier screen members 106 or at least one of the screen cells 104 having the portion of screen removed. In some embodiments, it is contemplated that the modified mesh geometry of a screen 100 of the present disclosure may include a staggered and alternating arrangement of barrier screen members 106 or at least one of the screen cells 104 having the portion of screen removed that extend orthogonal to a portion of some of the screen cells 104 and barrier screen members 106 or at least one of the screen cells 104 having the portion of screen removed that extend oblique to a portion of some of the screen cells 104.

Referring to FIG. 4, in another exemplary embodiment, each of the screen cells 104 include a second barrier screen member 120 that extends into the cavity 108 of the screen cell 104 and terminates at a second open end 122. The second open end 122 of each of the second barrier screen members 120 do not touch any portion of the screen cells 104. Furthermore, each of the screen cells 104 include a first portion of screen removed and a second portion of screen removed.

Referring to FIGS. 2-5, in exemplary embodiments, the screen 100 includes an assembly of screen members 102 that form a plurality of screen cells 104 in a rectangular configuration. Referring to FIGS. 7-10, in other exemplary embodiments, the screen 100 includes an assembly of screen members 102 that form a plurality of screen cells 104 in a triangular, skewed, diamond, parallelogram, quadrilateral, or other configurations. Referring to FIGS. 2-5 and 7-10, a screen 100 of the present disclosure includes an assembly of screen members 102 that form a plurality of screen cells 104 in an asymmetrical configuration. Referring to FIGS. 2-5 and 7-10, a screen 100 of the present disclosure includes an assembly of screen members 102 that form a plurality of screen cells 104 with a continuous material.

In an exemplary embodiment, a screen 100 of the present disclosure may be formed of any material having a suitable stiffness to provide FOD protection. For example, it is contemplated that a screen 100 of the present disclosure may be formed of metals, woods, plastics, carbon fibers, or other suitable materials, though it is contemplated that other materials may be used.

In one exemplary embodiment, a screen 100 of the present disclosure may be formed using precision casting, advanced machining, or other traditional manufacturing machines or methods. In one exemplary embodiment, a screen 100 of the present disclosure is formed using additive manufacturing machines or methods. As described in detail below, exemplary embodiments of the formation of a screen 100 of the present disclosure can involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming a screen 100 of the present disclosure using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a screen 100 to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein may be constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of a screen 100 of the present disclosure. Accordingly, a three-dimensional design model of the component may be defined prior to manufacturing. In this regard, a model or prototype of the component may be scanned to determine the three-dimensional information of the component. As another example, a screen 100 of the present disclosure may be constructed using a suitable computer aided design (CAD) program to define the three-dimensional design model of the component.

The design model may include 3D numeric coordinates of the entire configuration of a screen 100 of the present disclosure including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, a screen 100 of the present disclosure described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of a screen 100 of the present disclosure may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of a screen 100 of the present disclosure is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

While the present disclosure is not limited to the use of additive manufacturing to form a screen 100 of the present disclosure generally, additive manufacturing does provide a variety of manufacturing advantages, including ease of manufacturing, reduced cost, greater accuracy, etc.

Also, the additive manufacturing methods described above enable much more complex and intricate shapes and contours of a screen 100 described herein to be formed with a very high level of precision. For example, such components may include thin additively manufactured layers, cross sectional features, and component contours. In addition, the additive manufacturing process enables the manufacture of a screen 100 having different materials such that different portions of the component may exhibit different performance characteristics. The successive, additive nature of the manufacturing process enables the construction of these novel features. As a result, a screen 100 of the present disclosure formed using the methods described herein may exhibit improved performance and reliability.

In an exemplary aspect of the present disclosure, a method is provided for forming a screen for an air intake portion of a machine. The method includes forming an assembly of screen members that form a plurality of screen cells; and eliminating a portion of screen within each of the screen cells.

In certain exemplary aspects the open end of each of the barrier screen members do not touch any portion of the screen cells.

Further aspects of the invention are provided by the subject matter of the following clauses:

1. A screen for an air intake portion of a machine, the screen comprising: an assembly of screen members that form a plurality of screen cells; wherein at least a portion of the screen cells define an irregular configuration.

2. The screen of any preceding clause, wherein the screen includes a barrier screen member that extends into a cavity of at least one of the screen cells.

3. The screen of any preceding clause, wherein the barrier screen member terminates at an open end, and wherein the open end does not touch any portion of the screen cells.

4. The screen of any preceding clause, wherein the barrier screen member extends orthogonal to a portion of the screen cells.

5. The screen of any preceding clause, wherein the barrier screen member extends oblique to a portion of the screen cells.

6. The screen of any preceding clause, wherein the plurality of screen cells include a staggered and alternating arrangement of a plurality of barrier screen members.

7. The screen of any preceding clause, wherein each of the screen cells define the irregular configuration.

8. A screen for an air intake portion of a machine, the screen comprising: a modified mesh geometry of screen members that form a plurality of screen cells; and a barrier screen member that extends into a cavity of each of the screen cells.

9. The screen of any preceding clause, wherein each of the barrier screen members terminate at an open end, and wherein the open end of each of the barrier screen members do not touch any portion of the screen cells.

10. The screen of any preceding clause, wherein at least one of the barrier screen members extend orthogonal to a portion of the screen cells.

11. The screen of any preceding clause, wherein at least one of the barrier screen members extend oblique to a portion of the screen cells.

12. The screen of any preceding clause, wherein the plurality of screen cells include a staggered and alternating arrangement of barrier screen members.

13. The screen of any preceding clause, wherein each of the screen cells include a second barrier screen member that extends into the cavity of the screen cell and terminates at a second open end, and wherein the second open end of each of the second barrier screen members do not touch any portion of the screen cells.

14. A method for forming a screen for an air intake portion of a machine, the method comprising: forming an assembly of screen members that form a plurality of screen cells; and eliminating a portion of screen within each of the screen cells.

15. The method of any preceding clause, wherein each of the screen cells having the portion of screen removed extend into a cavity of the screen cell and terminate at an open end, and wherein the open end of each of the screen cells having the portion of screen removed do not touch any portion of the screen cells.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A system comprising:
   an engine including an air intake inlet; and
   a screen that covers the air intake inlet, the screen comprising an assembly of screen members that form a plurality of screen cells;
   wherein at least a portion of the plurality of screen cells define an irregular configuration, and wherein the plurality of screen cells cover the air intake inlet of the engine; wherein the plurality of screen cells include a first screen cell and a second screen cell, wherein the screen includes a barrier screen member that includes a first open end and a second open end, and wherein the first open end extends into a cavity of the first screen cell and the second open end extends into a cavity of the second screen cell; wherein the first open end does not touch any portion of the first screen cell and the second open end does not touch any portion of the second screen cell.

2. The system of claim 1, wherein the barrier screen member extends orthogonal to a portion of the first screen cell and the second screen cell.

3. The system of claim 1, wherein the barrier screen member extends oblique to a portion of the plurality of screen cells.

4. The system of claim 1, wherein the plurality of screen cells include a staggered and alternating arrangement of a plurality of barrier screen members.

5. The system of claim 1, wherein each of the plurality of screen cells define the irregular configuration.

6. A system comprising:
   an engine including an air intake inlet; and
   a screen that covers the air intake inlet, the screen comprising a modified mesh geometry of screen members that form a plurality of screen cells; and a barrier screen member that extends into a cavity of each of the plurality of screen cells, wherein the plurality of screen cells cover the air intake inlet of the engine; wherein the plurality of screen cells include a first screen cell and a second screen cell, wherein the barrier screen member includes a first open end and a second open end, and wherein the first open end extends into a first cavity of the first screen cell and the second open end extends into a second cavity of the second screen cell; wherein the first open end does not touch any portion of the first screen cell and the second open end does not touch any portion of the second screen cell.

7. The system of claim 6, wherein the plurality of screen cells include a staggered and alternating arrangement of barrier screen members.

8. The system of claim 6, wherein each of the plurality of screen cells include a second barrier screen member that extends into the cavity of each of the plurality of screen cells and terminates at a second open end, and wherein the second open end of each of the second barrier screen members do not touch any portion of the plurality of screen cells.

* * * * *